US010011722B2

(12) United States Patent
Yin et al.

(10) Patent No.: US 10,011,722 B2
(45) Date of Patent: Jul. 3, 2018

(54) METHODS AND SYSTEMS FOR PRODUCING ETHANOL BASED WARM FOAM MIX ASPHALT

(71) Applicant: The Trustees of Columbia University in the City of New York, New York, NY (US)

(72) Inventors: Huiming Yin, New York, NY (US); Po-Hua Lee, Sunnyvale, CA (US); Vincent Nasri, Brooklyn, NY (US); Luis Arias, Pembroke Pines, FL (US)

(73) Assignee: The Trustees of Columbia University in the City of New York, New York, NY (US)

(*) Notice: Subject to any disclaimer, the term of this patent is extended or adjusted under 35 U.S.C. 154(b) by 293 days.

(21) Appl. No.: 14/897,258

(22) PCT Filed: Jun. 18, 2014

(86) PCT No.: PCT/US2014/042966
§ 371 (c)(1),
(2) Date: Dec. 10, 2015

(87) PCT Pub. No.: WO2014/205092
PCT Pub. Date: Dec. 24, 2014

(65) Prior Publication Data
US 2016/0152830 A1    Jun. 2, 2016

Related U.S. Application Data

(60) Provisional application No. 61/836,420, filed on Jun. 18, 2013.

(51) Int. Cl.
*C08L 95/00*    (2006.01)
*C08K 5/05*    (2006.01)
(Continued)

(52) U.S. Cl.
CPC ............... *C08L 95/00* (2013.01); *B01J 8/00* (2013.01); *C08K 3/013* (2018.01); *C08K 5/05* (2013.01);
(Continued)

(58) Field of Classification Search
CPC ...... C08L 95/00; C08L 91/00; C08L 2555/22; C08L 2555/24; C08L 2555/26;
(Continued)

(56) References Cited

U.S. PATENT DOCUMENTS 2,901,369 A    8/1959    Pordes
4,692,350 A    8/1987    Clarke et al.
(Continued)

FOREIGN PATENT DOCUMENTS

EP    1398351 B1    6/2007

OTHER PUBLICATIONS

International Search Report and the Written Opinion of the International Searching Authority, International Application No. PCT/US2014/042966, filed Sep. 8, 2014.

*Primary Examiner* — Jennifer A Smith
*Assistant Examiner* — Alexandra M Moore
(74) *Attorney, Agent, or Firm* — Murtha Cullina LLP; Anthony P. Gangemi

(57) ABSTRACT

Methods and systems for producing warm foam mix asphalt are disclosed. In some embodiments, the methods include the following: injecting an ethanol additive into asphalt binder having a temperature below the auto ignition point of ethanol to form a foamed asphalt stream; adding the foamed asphalt stream to a mixing zone; adding at least one of aggregate and reclaimed asphalt pavement to the mixing zone; adding a foaming agent to the mixing chamber; heating at least one of the mixing zone and the at least one of aggregate and reclaimed asphalt pavement; mixing the
(Continued)

foamed asphalt stream and the at least one of aggregate and reclaimed asphalt pavement to form a warm foam mix asphalt; collecting emissions from the mixing zone, the emissions including ethanol vapors; and recycling the emissions to the mixing zone.

20 Claims, 2 Drawing Sheets

(51) Int. Cl.
    *B01J 8/00*     (2006.01)
    *C08K 3/013*     (2018.01)

(52) U.S. Cl.
    CPC ............ *B01J 2208/00017* (2013.01); *B01J 2208/00575* (2013.01); *C08L 2555/22* (2013.01); *C08L 2555/24* (2013.01); *C08L 2555/30* (2013.01); *C08L 2555/34* (2013.01); *C08L 2555/52* (2013.01); *Y02A 30/333* (2018.01)

(58) Field of Classification Search
    CPC ............ C08L 2555/30; C08L 2555/34; C08L 2555/28; C08L 2555/52; C09D 195/00; C10C 3/00; C08K 5/05
    See application file for complete search history.

(56) References Cited

U.S. PATENT DOCUMENTS

| | | |
|---|---|---|
| 2002/0170464 A1 | 11/2002 | Larsen et al. |
| 2012/0213584 A1 | 8/2012 | Reinke et al. |
| 2013/0074729 A1 | 3/2013 | Reinke et al. |
| 2013/0276668 A1* | 10/2013 | Ranka ............ C08L 95/005 106/122 |

* cited by examiner

METHODS AND SYSTEMS FOR PRODUCING ETHANOL BASED WARM FOAM MIX ASPHALT

CROSS REFERENCE TO RELATED APPLICATION(S)

This application claims the benefit of U.S. Provisional Application No. 61/836,420, filed Jun. 18, 2013, which is incorporated by reference as if disclosed herein in its entirety.

STATEMENT REGARDING FEDERALLY SPONSORED RESEARCH OR DEVELOPMENT

This invention was made with government support under grant no. CMM 0954717 awarded by the National Science Foundation. The government has certain rights in the invention.

BACKGROUND

Due to its excellent waterproofing and strong adhesive properties, asphalt materials have been widely used in highway, airport, and building construction. As a thermoplastic material, the mechanical properties of asphalt greatly change with temperature and time of loading. These materials are commonly manufactured at a higher temperature range of 280-320° F. (138-160 ° C.) for better workability and controllable quality. During the material manufacturing, a great amount of greenhouse gas and other emissions are produced, which potentially contributed to global warming and local environment deterioration. Due to the smoke and odor in material production, the applications of asphalt materials are often limited to night construction in some urban areas. Moreover, the aging process of asphalt will be accelerated at a high temperature, which may negatively affect its life cycle performance.

Warm Mix Asphalt (WMA) refers to asphalt mixes that are produced at lower temperatures than HMA. There are typically three categories in which to characterize the production of asphalt mixtures: Cold Mix; Warm Mix Asphalt; and Hot Mix Asphalt. These classifications are based on the temperature at which these mixtures are produced. WMA mixtures are commonly produced at temperatures 40-50° C. (104-122° F.) lower than HMA, which are produced at about 100-140° C. (212-284° F.).

There are many environmental benefits to producing asphalt as a WMA. Since asphalt is a petroleum based product, when heated to high temperatures it yields $CO_2$ as a by-product. WMA can drastically decrease these emissions, because at lower temperatures the WMA mixture produced in the drum and placed in a construction site requires less gas/fuel consumption and releases less smoke/odor, respectively. The working conditions are improved because of the decrease in fumes and emissions for the workers.

The asphalt mix when created as a WMA becomes more versatile. Many benefits arise from WMA mixes during paving. Improved workability because of lower viscosities, the ability for cold weather paving because of the change in temperature between the road and the asphalt over time is decreased, reduced pavement cooling time, and the ability to pave longer distances because of lower initial temperature. Within the WMA category there were three different ways to classify the technology: foaming technique; organic/wax additive; and chemical additives. In recent years, some emerging WMA technologies and mechanisms have been proposed.

Foaming processes, as an excellent example of green technologies, save energy cost and reduce CO2 emission. They are also used in recycling asphalt pavements. The main research in foaming processes of asphalt materials focuses on the performance and workability test. Due to a lower production temperature, the moisture within asphalt may not be completely expelled out and thus increase potential for moisture damages such as stripping and segregation.

Foaming process was developed in asphalt industry for soil stabilization around 50 years ago. In recent years, due to its lower energy consumption and emissions, highway engineering industry started to use it in cold in-place recycling pavement, cold mix asphalt, and warm mix asphalt construction.

The traditional foamed asphalt is called expanded asphalt. Expanded asphalt is produced when water is injected into the hot asphalt binder. The water is turned into vapor and is trapped in numerous tiny bubbles in the asphalt, causing spontaneous foaming, causing the volume of asphalt to increase greatly. However, the foam dissipates in a very short time, often less than one minute, so that asphalt materials have to be manufactured within a small time window while the asphalt binder is still in its foamed state.

Foaming processes significantly increase the volume of asphalt binder with large surface area in the unit volume. When asphalt mixes with aggregate, a strong coating with high shear strength of the mix can be generated. In addition, because foamed asphalt is flexible and has much larger volume, the workability is considerably improved, so that asphalt materials manufacturing can be operated at a lower temperature within a shorter time. The optimum asphalt content of a foamed asphalt mix can be lower than that for the non-foamed one. Therefore, the following advantages of foamed asphalt are well documented as: reduced binder cost, saving in time, energy conservation, environmental benignancy, better workability, and broad applicability. In addition, because water is only used as an agent during production, and will be expelled in compaction, the chemical properties of asphalt are not changed and thus the existing engineering specifications are still applicable. Moreover, because aging effects are reduced at lower temperatures, the long-term performance of asphalt materials will be improved.

However, in the traditional foaming process, the volume of asphalt binder significantly changes within the short process window, which produces difficulties in quality control. In recent years, emerging foaming processes have been invented to prolong the foaming process window and therefore extend the applications to massive construction and production. For example, zeolite, a water bearing additive, is added to asphalt binder to reduce the production temperature and improve the workability.

In construction, with the addition of up to 0.3% zeolite in weight of total asphalt mixtures, asphalt production temperature can be reduced to 50-70° F. lower than that of traditional hot mix, so that up to 40% energy savings and 60% emission reduction can be achieved. Low energy asphalt (LEA) was introduced in 2005 in France. This new process uses sequential mixing of the asphalt binder with a chemical additive and coarse aggregate at high temperature, followed by adding wet sand to create a foaming action. Since the fine sand carries the most moisture, they consume the most amount of energy to dry and lower down the production temperature. The desired mix discharge temperature is as low as 203° F., and thus causes a 40-55% reduction in energy consumption.

As a green construction technology, foaming based WMA has been used in recycling asphalt pavement and new construction, and demonstrates great potential to: Reduce energy consumption and cost; Reduce emissions such as carbon dioxide, blue smoke, and odor; Reduce binder oxidation prolonging the life of asphalt materials; Improve compactability to assure the in-place density of asphalt pavements; and Reduce the life cycle cost of asphalt materials.

As a result, a lot of construction projects, which are impossible for traditional hot mix asphalt, can be done with these foaming processes, such as projects requiring long haul distances, constructed in lower temperature weather or seasons, and sited in urban area. However, the physics and chemistry of this empirical engineering practice has not been fully understood, and some problems have been observed in construction.

SUMMARY

Traditional asphalt production requires high temperature heating of the asphalt blend to reduce viscosity and achieve thorough mixing. Well-mixed asphalt exhibits better construction and performance over its lifetime as evidenced by the improved quality of road asphalt built using this method. In recent years, a new class of asphalt called warm mix asphalt has been developed which uses mixture additives to reduce the viscosity at lower temperatures, allowing for better workability. This technology is a method for producing warm mixed asphalt using an ethanol solution. By using ethanol, instead of existing water-based techniques, the technology further reduces the temperature necessary to remove unwanted moisture in the asphalt as it cures. This is achieved through the chemical properties of ethanol which has a lower boiling point and latent heat than water. In addition, the technology also minimizes the risk of moisture trapping within the asphalt that could otherwise lead to structural problems. The reduced temperature requirements in this technology make the overall asphalt production process efficient and sustainable from both economic and environmental perspectives.

Some embodiments of the disclosed subject matter include a warm mix asphalt technology, which includes ethanol as an asphalt binder to produce foamed asphalt for better workability and lower production temperature. Foamed asphalt according to the disclosed subject matter significantly reduces gas consumption and greenhouse gas emissions during the production of warm-mix asphalt. Compared with the existing water based warm mix asphalt technologies, because the specific heat and latent heat of ethanol are significantly lower than those of water, ethanol based foaming according to the disclosed subject matter produces more bubbles at lower temperatures without water remaining in the mix, which allows more energy savings while avoiding moisture susceptibility. In addition, the ethanol is typically evaporated during the production process. Adding 1-2% of ethanol significantly reduces the viscosity up to 95%, and cause a large volume increase of 30-40%, which increases production efficiency thereby improving the sustainability of asphalt materials engineering and decreasing the life cycle cost of pavement construction.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
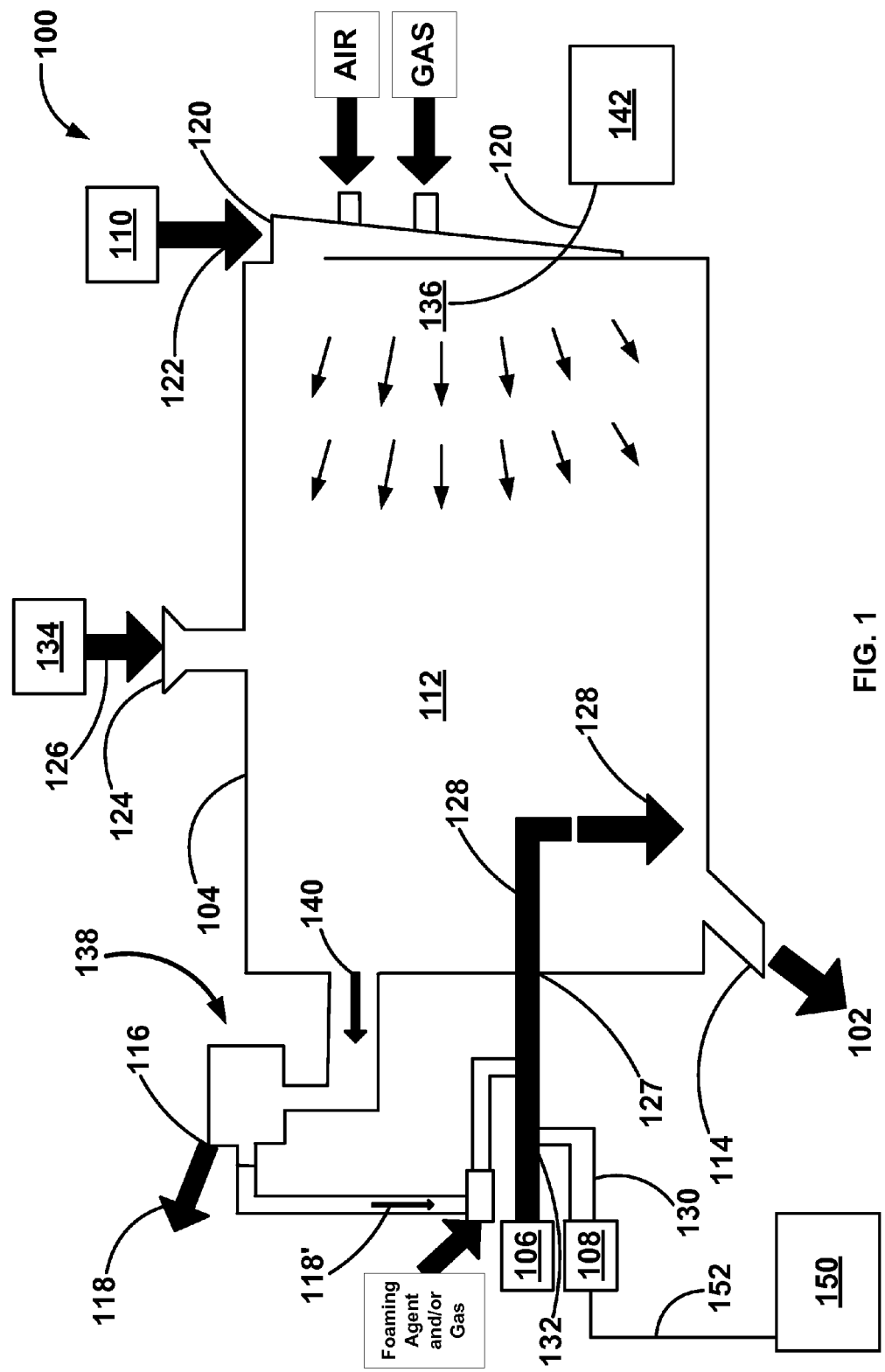
FIG. 1 is a schematic diagram of methods and systems according to some embodiments of the disclosed subject matter.

Referring now to FIG. 1, aspects of the disclosed subject matter include a system 100 for producing a warm foam mix asphalt 102, which includes a mixture of ethanol and asphalt as an asphalt binder to produce foamed asphalt for better workability and lower production temperature. In some embodiments, system 100 includes a mixing chamber 104 that is in communication with a supply of asphalt binder 106, a supply of ethanol additive 108, and a supply of aggregate 110, all of which are mixed and heated to produce warm foam mix asphalt 102.

In some embodiments, mixing chamber 104 includes a mixing zone 112, an outlet 114 for dispensing warm foam mix asphalt 102, an outlet 116 for releasing emissions 118, an inlet 120 for receiving aggregate 122, an inlet 124 for receiving reclaimed asphalt pavement 126, an inlet 127 for receiving a foamed asphalt stream 128 including both ethanol 130 and asphalt binder 132.

Aggregate 122 is obtained from supply of aggregate 110, which is in fluid communication with inlet 120 of mixing chamber 104. Ethanol 130 is included in and obtained from supply of ethanol additive 108, e.g., 200-proof ethyl alcohol, which is in fluid communication with supply of asphalt binder 106, e.g., PG 64-22, which performs through a pavement temperature range from −22° C. (−7.6° F.) to 64° C. (147.2° F.) with minimum rutting and thermal cracking Reclaimed asphalt pavement 126 is provided from a supply of reclaimed asphalt pavement 134, which is in fluid communication with mixing chamber 104.

System 100 includes a source of heat 136, e.g., a flame developed from air and gas blown into mixing chamber 104, for heating at least one of mixing chamber 104, supply of aggregate 110, and supply of asphalt binder 132. Typically, source of heat 136 has a temperature greater than 1000 degrees Celsius. System 100 includes an emission collection and treatment module 138 for collecting and treating emissions 140, and recycling emissions 118' from mixing zone 112 and mixing chamber 104 via outlet 116 back to the mixing chamber. Module 138 typically includes a bag house to filter ash out of emissions 140 and a carbon filter to filter other gases, e.g., including volatile organic carbons and ethanol, prior to recycling them to mixing chamber 104. Alternatively or in addition, emissions 118' are recycled back into mixing chamber by mixing them with air that is provided to source of heat 136.

In some embodiments, system 100 includes a temperature control module 142 for monitoring and controlling temperatures of mixing chamber 104, supply of aggregate 110, and supply of asphalt binder 106. In some embodiments, module 142 includes an automatic control mechanism 144 for automatically adjusting source of heat 136 so that asphalt binder 132 and aggregate 122 are heated to predetermined temperatures. In some embodiments, a predetermined temperature of supply of asphalt binder 106 is about 300 to about 355 degrees Fahrenheit. In some embodiments, a predetermined temperature of supply of aggregate 110 is about 190 to about 260 degrees Fahrenheit.

In some embodiments, system 100 includes a viscosity control module 150 for monitoring and controlling a viscosity of foamed asphalt stream 128, which includes both ethanol 130 from supply of ethanol additive 108 and asphalt binder 132 from supply of asphalt binder 106. In some embodiments, module 150 includes an automatic control mechanism 152 for automatically adjusting an amount of ethanol additive 108 added to foamed asphalt stream 128 so that the stream has a viscosity substantially equal to a predetermined viscosity. In some embodiments, a predetermined viscosity is about 85 to 100 percent lower than a viscosity of supply of asphalt binder 106 before adding supply of ethanol additive 108.

Figure 2:
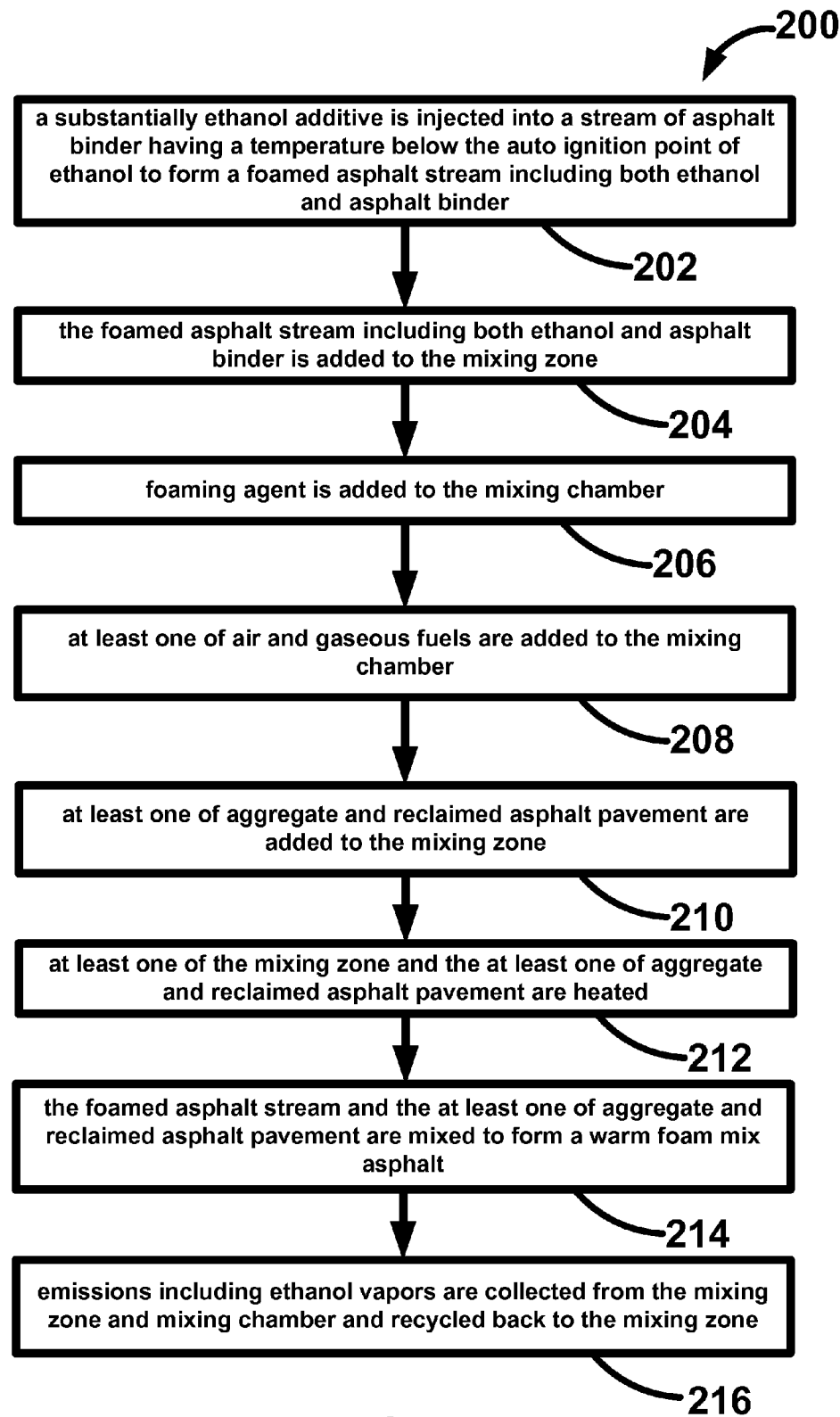
FIG. 2 is a chart of a method according to some embodiments of the disclosed subject matter.

Referring now to FIG. 2, some embodiments of the disclosed subject matter include a method 200 of producing warm foam mix asphalt. At 202, a substantially ethanol additive is injected into a stream of asphalt binder having a temperature below the auto ignition point of ethanol to form a foamed asphalt stream including both ethanol and asphalt binder. In some embodiments, the asphalt binder has a temperature of about 300 to about 355 degrees Fahrenheit. Typically, a predetermined amount of the ethanol additive is mixed with the binder until the foamed asphalt stream has a predetermined, desired viscosity and a predetermined, desired volume. In some embodiments, the foamed asphalt stream includes about one to two percent ethanol by mass. Typically, but not always, the foamed asphalt stream includes an amount of the ethanol additive that causes it to have a second viscosity that is about 85 to 100 percent less than a first viscosity of the asphalt binder prior to mixing with the ethanol additive. At 204, the foamed asphalt stream including both ethanol and asphalt binder is added to the mixing zone. At 206, a foaming agent, e.g., sodium bicarbonate is added to the mixing chamber. At 208, air and or gaseous fuels are added to the mixing chamber. In some embodiments, carbon dioxide and/or nitrogen gas are added to the mixing chamber. At 210, at least one of aggregate and reclaimed asphalt pavement is added to the mixing zone. At 212, at least one of the mixing zone and the at least one of aggregate and reclaimed asphalt pavement are heated, i.e., typically from a flame. In some embodiments, at least one of aggregate and reclaimed asphalt pavement is heated to a temperature of about 190 to about 260 degrees Fahrenheit. At 214, the foamed asphalt stream and the at least one of aggregate and reclaimed asphalt pavement are mixed to form a warm foam mix asphalt (WMA). At 216, emissions including ethanol vapors are collected from the mixing zone and mixing chamber and recycled back to the mixing zone.

In some embodiments, ethanol decreases the viscosity of un-aged pure asphalt binder. It shows that the higher the ethanol content by mass of binder, the lower the viscosity of that binder at both 60° C. and 100° C. and at every temperature in between.

In some embodiments, the foaming technique involves injecting small amounts of ethanol into the hot asphalt binder during mixing. When the asphalt cools, the ethanol remains trapped within the binder. Upon reheating, the boiling point of ethanol is approximated to be 78.6° C., the ethanol within the binder evaporates leaving behind air voids, which temporarily increases the volume of the binder. This increase in volume decreases the viscosity allowing for improved workability and production of asphalt concrete at lower temperatures.

The volume change for a 1.4% ethanol content sample was a 36.8% volume increase. From an asphalt foaming standpoint, the more volumetric expansion the lower the viscosity. The volume expansion data collected confirms that the use of ethanol additive improves the volumetric expansion of the asphalt binder.

Mixing ethanol into asphalt at a higher temperature, say 80-100° C. (176-212° F.), produces a significant amount of bubbles. This foaming process increases the surface area of the asphalt binder and greatly reduces its viscosity. When mixed with a granular material, higher shear strength of the mixture can be obtained. In addition, because foamed asphalt is flexible and has much a larger volume, the workability is considerably improved, so that the asphalt materials manufacturing can be operated at a lower temperature within a shorter time. The optimum asphalt content of a foamed asphalt mix can be lower than that for the non-foamed one.

Therefore, the following advantages of foamed asphalt are well documented as: reduced binder cost, saving in time, energy conservation, environmental benignancy, better workability, and broad applicability. In addition, because ethanol is only serves as an agent during production, and will be expelled in compaction, the chemical properties of asphalt are not changed and thus the current engineering specifications can be still applicable. Moreover, because the aging effects are reduced at lower temperatures, the long-term performance of asphalt materials is improved.

Referring again to FIG. 1, some embodiments include modifying existing asphalt plants to include systems according to the disclosed subject matter. Typically, only minor modifications are required. For a typical drum mixer as shown in FIG. 1, before the asphalt binder is pumped to the entrance of the mixing zone of the mixer at a temperature of 325-350° F., which is still below ethanol's auto-ignition temperature, ethanol is ejected into the asphalt flow with the designed proportion through an injection mixing pipe. It will immediately be vaporized and generate foamed asphalt with a much larger volume and lower viscosity. During the mixing process, the ethanol vapor will be separated from asphalt and be collected with other emission gases, which are typically recycled and reintroduced back to the drum's combustion zone. FIG. 1 schematically illustrates the WMA production process with the ethanol injection-mixing pipe. The aggregates/RAP can be heated to 90-121° C. (194-250° F.), which are determined by future mix design and plant production.

Still referring to FIG. 1, this production line is very similar to a typical drum mix plant with a center inlet, but has two distinct differences, the introduction of an injection mixing pipe and a gas emission control tank. The injection-mixing pipe ensures that the ethanol additive mixes with the liquid asphalt before it is poured into the drum-mixing chamber. The mixing pipe will also be made of a hermetic pipe, which ensures no ethanol loss because the gases produced by the heating of the asphalt will circulate until exiting through gas emissions control tank. This pipe will both mix the ethanol and due to the initial heat of the liquid asphalt will also foam the asphalt at the same time. The pipe will lead into the main drum-mixing chamber. This foamed asphalt will have a lower viscosity than pure liquid asphalt and thus a much-improved workability within the mixing chamber. Here the foamed asphalt will combine with Recycled Asphalt Pavement (RAP), virgin aggregate, and the heat of the burner. The foamed asphalt will allow for shorter mixing times and in return less energy needed to produce the warm mix asphalt concrete.

Again, as discussed above, before the asphalt binder is pumped to the entrance of the mixing zone of the mixer at a temperature of 325-350° F., which is still below ethanol's auto-ignition temperature, a specified portion of ethanol is injected into the asphalt flow through an injection mixing pipe. Numerous bubbles will be generated by the vaporized ethanol, which significantly increases the volume of foamed asphalt. Depending on the pH value, an appropriate amount of a foaming agent, e.g., baking soda ($NaHCO_3$, also called sodium bicarbonate), will be used in conjunction with $CO_2$ and $N_2$ blowing gases. As the temperature rises the foaming agent will release $CO_2$, which together with the blown gas will intensify the foaming process. During the mixing process, the ethanol vapor will be separated from asphalt and partially burnt with gas. The rest will be collected with other emission gases that are recycled and reintroduced back to the drum's combustion zone. The aggregates/RAP can be heated to 90-121° C. (194-250° F.).

Because the workability of the ethanol modified asphalt binder can be dramatically improved, this technology will produce broad impacts on some other sustainable asphalt recycling and production approaches, such as fiber reinforced asphalt, rubberized asphalt, and polymerized asphalt.

Methods and systems according to the disclosed subject matter produce a warm-mix asphalt that is cost effective and energy efficient, reducing the heat energy requirement to bring asphalt binder to mixing and compaction viscosities without changing the material's intrinsic properties.

The heat energy required to heat asphalt binder to mixing temperature can be quantified using equation 1.

$$Q=c\rho\Delta\theta \quad (1)$$

Where Q is the heat energy (J), c is the specific heat capacity coefficient (J/(kg/° C.)), p is the mass density of the material (kg), and $\Delta\theta$ is the change from ambient temperature to mixing temperature (° C.). Based on testing of WMA prepared according to the disclosed subject matter, the heat equation shows that the amount of heat energy is correlated to the intrinsic properties of the asphalt and the quantity of ethanol additive present. It can be seen from the existing tests that some embodiments included a binder additive content of about 1.4%. This proportion of ethanol to binder produced about 95% viscosity reduction and about 35% volume increase for the temperature range studied, which translates into the smallest temperature change, $\Delta\theta$, when projecting the temperature to up to mixing temperature.

In order to compare the energy needed to vaporize the ethanol within the asphalt binder, the following equation is used, $Q=mCv$, where m is the mass of the substance (kg), Cv is the latent heat of vaporization (kJ/kg). Using a unit mass of ethanol, 1 gram, and assuming that the ethanol starts out a room temperature, 20° C. (293.15 K), the energy required to vaporize the ethanol is 838 J. The energy required to vaporize water is approximately 2258 J. The use of ethanol in the WMA mix process decreases the energy needed to vaporize the material additive by about 62.8%. Moreover, water based WMA requires a higher production temperature. Notice that the vaporized ethanol is not a waste, but is recycled to heat aggregates again.

There are significant economic benefits to switching from HMA production to WMA production. The economic costs depend on three different criteria, the cost of modifying asphalt production plants, the cost of the additive, and the cost of implementing the technology. Ethanol is a relatively cheap material compared to other additives such as Advera® or Aspha-min or gas. Only 1-2% of ethanol is needed for the foaming process, thus the cost of this WMA is minimal. Moreover, the ethanol used in the foaming process will be reused in aggregate heating. Also the ability to implement ethanol into the production of the WMA is almost on par with that of other WMA additives. As stated before, the ethanol loss when injecting into the hot asphalt binder will not happen as in our laboratory tests because of the configuration of the hermetic injection-mixing pipe.

Since WMA is produced at temperatures lower than HMA, less energy must be used to reach mixing temperatures. This can result in a decrease in the burning of fossil fuels, more efficient usage of energy within the production system. Less time needed to reach mixing temperatures, thus a larger supply of asphalt can be produced in a shorter amount of time.

During the mixing process, asphalt binder must be fluid enough to fully coat the aggregates and form a homogenous blend. This blend is then laid down in layers and compacted. It is used extensively in constructions projects such as road surfaces, parking lots and airports. To form such a mixture, the asphalt binder must be fluidic enough such that the aggregates can be fully coated and strongly adhere together. For un-aged asphalt binder, the recommended mixing and compaction temperatures should produce a binder viscosity of 0.17±0.02 Pa-s and 0.28±0.03 Pa-s, respectively.

Because the flash point of ethanol is very low, the safety in material handling is a concern. However, because the injection mixing pipe is totally hermetic, the temperature of binder is well below the auto-ignition temperature, and the emission gas is recycled for aggregate heating, the fire risk outside the drum mixer is minimal. From tests, ethanol is very volatile at temperature >80° C. and will not remain in the WMA after the mixing process with aggregates.

During the foaming process, large pressure may be induced in the injection mixing pipe. But, because the injection mixing pipe is close to the asphalt nozzle in the drum mixer, a large part of gained pressure will be released by the motion of the foamed asphalt into the mixer, which is good for asphalt production.

Ethanol may not only change the physical properties of modified asphalt binder, but it also may cause chemical reaction and thus change asphalt PG grade. A thorough literature review indicated that no evidence of a chemical reaction has been found in the literature. In addition, only 1-2% ethanol is used, from the mass analysis we can see the major part of this added ethanol content has been released eventually.

Ethanol is very promising WMA additive for the foaming process as 1-2% of ethanol used in asphalt binder may produce a 30-40% volume increase. WMA with ethanol additive significantly improves the sustainability of future asphalt concrete production. Reducing production temperatures for mixing asphalt has important environmental and health benefits including lower greenhouse gas emissions and reduced fuel consumption. Ethanol as a warm mix additive can significantly reduce the viscosity of the binder when comparing it to conventional asphalt binder without the additive.

The proposed WMA produces significant economic benefits for low additive cost, energy saving, production time saving, and others caused by better workability.

The following are advantages of using ethanol over water:

1) Due to the vaporization of ethanol at a lower temperature with significantly lower latent heat, the temperature of asphalt binder will not change too much during the injection mixing process;

2) More bubbles and much lower effective viscosity of modified asphalt binder will dramatically improve the workability of WMA production and construction;

3) Considering the difference of boiling point between water and ethanol, much lower production temperature is allowed using ethanol, say a temperature below 212° F.;

4) Because ethanol will be burnt with gas during the mixing process, the moisture susceptibility caused by water agents will be much alleviated in this process; and 5) Although extra cost of ethanol is added, the combustion of ethanol will save the gas needed in the mixing process.

The lower latent heat and production temperature will lead to a greater saving of energy and lower emissions.

Using ethanol avoids the moisture problems with even higher energy saving. The advantages of using ethanol as an additive to WMA were at least partially discovered by an observation of the tests of two groups. One group was investigating water based asphalt foaming test but found it was too hard to control the temperature during foaming process because water vaporization consumes much energy; whereas another group was using ethanol to disperse carbon nanotubes for nano-composite fabrication but found much bubbles was induced during the curing process because of the remaining ethanol. The two problems in the two groups catalyze this transformative concept—ethanol based WMA technology. Due to the vaporization of ethanol at a lower temperature with significantly lower latent heat, the temperature of asphalt binder will not change too much during the injection mixing process and the large amount of bubbles and much lower effective viscosity of modified asphalt binder will dramatically improve the workability of WMA production and construction. In addition, it will easily lower down the minimum production temperature of the water based WMA, which should be 30-60° F. higher than boiling point of water. With ethanol, it is possible to produce WMA below 212° F.

Methods and systems according to the disclosed subject matter include an ethanol-based process and system for producing WMA. The additives produce foamed asphalt that has better workability properties and at a lower temperature than conventional asphalt. Using ethanol as an WMA additive provides more bubbles at lower temperatures—attributed to the lower specific and latent heats of ethanol as compared with water—and avoids the moisture susceptibility problem that occurs when water remains in the cured asphalt. Furthermore, the ethanol additive evaporates when asphalt is cured and no additional solids must be added to the WMA mix. Since less heat is required, greenhouse gas and cost savings are reduced.

In some embodiments, WMA according to the disclosed subject matter is used in the production of asphalt for non-road applications, such as water-proofing roofs.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of producing a warm foam mix asphalt, comprising:
    injecting a substantially ethanol additive into a stream of asphalt binder having a temperature below the auto ignition point of ethanol to form a foamed asphalt stream including both ethanol and asphalt binder;
    adding said foamed asphalt stream including both ethanol and asphalt binder to a mixing zone;
    adding at least one of aggregate and reclaimed asphalt pavement to said mixing zone;
    heating at least one of said mixing zone and said at least one of aggregate and reclaimed asphalt pavement; and
    mixing said foamed asphalt stream and said at least one of aggregate and reclaimed asphalt pavement to form a warm foam mix asphalt.

2. The method according to claim 1, further comprising:
    mixing a predetermined amount of said ethanol additive with said binder until said foamed asphalt stream has a predetermined viscosity and a predetermined volume.

3. The method according to claim 2, wherein said foamed asphalt stream includes about one to two percent ethanol by mass.

4. The method according to claim 2, wherein said foamed asphalt stream includes an amount of said ethanol additive that causes it to have a second viscosity that is about 85 to 100 percent less than a first viscosity of said asphalt binder prior to mixing with said ethanol additive.

5. The method according to claim 1, wherein said asphalt binder has a temperature of about 300 to about 355 degrees Fahrenheit.

6. The method according to claim 1, wherein said at least one of aggregate and reclaimed asphalt pavement is heated to a temperature of about 190 to about 260 degrees Fahrenheit.

7. The method according to claim 1, further comprising:
    collecting emissions from said mixing zone, said emissions including ethanol vapors; and
    recycling said emissions to said mixing zone.

8. The method according to claim 1, further comprising:
    adding sodium bicarbonate to said mixing chamber; and
    adding at least one of carbon dioxide and sodium blowing gases to said mixing chamber.

9. A system for producing warm foam mix asphalt, said system comprising:
    a mixing chamber including a mixing zone, an outlet for dispensing warm foam mix asphalt and an outlet for releasing emissions;
    a supply of asphalt binder in fluid communication with said mixing chamber;
    a supply of ethanol additive in fluid communication with said supply of asphalt binder;
    a supply of aggregate in fluid communication with said mixing chamber;
    a source of heat for heating at least one of said mixing chamber, said supply of aggregate, and said supply of asphalt binder; and
    an emission collection and treatment module for collecting, treating, and recycling emissions generated in said mixing chamber via said outlet and back to said mixing chamber.

10. The system according to claim 9, further comprising:
    a supply of reclaimed asphalt pavement in fluid communication with said mixing chamber.

11. The system according to claim 9, further comprising:
    a temperature control module for monitoring temperatures of said mixing chamber, said supply of aggregate, and said supply of asphalt binder; and
    an automatic control mechanism for automatically adjusting said source of heat so that said asphalt binder and said supply of aggregate are heated to predetermined temperatures.

12. The system according to claim 11, wherein said predetermined temperature of said supply of asphalt binder is about 300 to about 355 degrees Fahrenheit.

13. The system according to claim 11, wherein said predetermined temperature of said supply of aggregate is about 190 to about 260 degrees Fahrenheit.

14. The system according to claim 9, further comprising:
   a viscosity control module for monitoring a viscosity of a stream including said supply of asphalt binder and said supply of ethanol additive; and
   an automatic control mechanism for automatically adjusting an amount of said ethanol additive added to said stream so that said stream has a viscosity substantially equal to a predetermined viscosity.

15. The system according to claim 14, wherein said predetermined viscosity is about 85 to 100 percent lower than a viscosity of said supply of asphalt binder before adding said supply of ethanol additive.

16. A method of producing a warm foam mix asphalt, comprising:
   injecting a substantially ethanol additive into a stream of asphalt binder having a temperature below the auto ignition point of ethanol to form a foamed asphalt stream including both ethanol and asphalt binder;
   adding said foamed asphalt stream including both ethanol and asphalt binder to a mixing zone;
   adding at least one of aggregate and reclaimed asphalt pavement to said mixing zone;
   adding a foaming agent to said mixing chamber;
   heating at least one of said mixing zone and said at least one of aggregate and reclaimed asphalt pavement;
   mixing said foamed asphalt stream and said at least one of aggregate and reclaimed asphalt pavement to form a warm foam mix asphalt;
   collecting emissions from said mixing zone, said emissions including ethanol vapors; and
   recycling said emissions to said mixing zone.

17. The method according to claim 16, wherein said foamed asphalt stream includes about one to two percent ethanol by mass.

18. The method according to claim 16, wherein said foamed asphalt stream includes an amount of said ethanol additive that causes it to have a second viscosity that is about 85 to 100 percent less than a first viscosity of said asphalt binder prior to mixing with said ethanol additive.

19. The method according to claim 16, wherein said asphalt binder has a temperature of about 300 to about 355 degrees Fahrenheit.

20. The method according to claim 16, wherein said at least one of aggregate and reclaimed asphalt pavement is heated to a temperature of about 190 to about 260 degrees Fahrenheit.

* * * * *